US011148467B2

(12) United States Patent
Falossi et al.

(10) Patent No.: US 11,148,467 B2
(45) Date of Patent: Oct. 19, 2021

(54) SEALING DEVICE FOR A HUB/WHEEL ASSEMBLY AND HUB/WHEEL ASSEMBLY HAVING SUCH A SEALING DEVICE

(71) Applicant: Aktiebolaget SKF, Gothenburg (SE)

(72) Inventors: Marco Falossi, San Raffaele Cimena (IT); Maurizio Bertoia, Turin (IT); Giorgio Missiaggia, Piscina (IT)

(73) Assignee: Aktiebolaget SKF

( * ) Notice: Subject to any disclaimer, the term of this patent is extended or adjusted under 35 U.S.C. 154(b) by 546 days.

(21) Appl. No.: 16/113,316

(22) Filed: Aug. 27, 2018

(65) Prior Publication Data

US 2019/0070898 A1    Mar. 7, 2019

(30) Foreign Application Priority Data

Sep. 5, 2017   (IT) .................. 102017000099285

(51) Int. Cl.
   *B60B 27/00* (2006.01)
   *F16C 33/78* (2006.01)
   (Continued)

(52) U.S. Cl.
   CPC .......... *B60B 27/0073* (2013.01); *B60B 27/02* (2013.01); *F16C 19/38* (2013.01);
   (Continued)

(58) Field of Classification Search
   CPC .............. F16C 33/7886; F16C 33/586; F16C 33/7843; F16C 33/78; F16C 19/38;
   (Continued)

(56) References Cited

U.S. PATENT DOCUMENTS 3,614,183 A * 10/1971 Berens .................. F16C 35/067
                                                    384/486
3,741,615 A *  6/1973 Otto ...................... F16C 33/783
                                                    384/486
(Continued)

FOREIGN PATENT DOCUMENTS

CN    101387318    3/2009
CN    101675259    3/2010
(Continued)

OTHER PUBLICATIONS

Office Action for corresponding Chinese Application No. CN 201811018266.3 dated Apr. 1, 2021.

*Primary Examiner* — Scott A Browne
(74) *Attorney, Agent, or Firm* — Reed Smith LLP

(57) ABSTRACT

A sealing device for a hub/wheel assembly with a roller bearing, the sealing device comprising a guard, made of plastic, which is coupled to an outer ring of the bearing so as to seal off the bearing, and which has a cylindrical mounting wall having an outer lateral surface coupled to an inner lateral surface of a collar of the outer ring. The sealing device includes a snap-engagement tooth for engaging with the collar made along the outer lateral surface so that the snap-engagement tooth snap-fits in a contoured annular groove made along the collar about the axis and an annular gasket made of thermoplastic elastomer being co-injection-molded inside a gripping seat made in the cylindrical mounting wall on the same side as the snap-engagement tooth, substantially at a corner defined between the cylindrical mounting wall and an annular reading wall transverse to the cylindrical mounting wall.

8 Claims, 3 Drawing Sheets

(51) Int. Cl.
*F16C 33/58* (2006.01)
*F16C 33/72* (2006.01)
*B60B 27/02* (2006.01)
*F16C 19/38* (2006.01)
*F16C 19/18* (2006.01)
*F16C 41/00* (2006.01)

(52) U.S. Cl.
CPC .......... *F16C 33/586* (2013.01); *F16C 33/723* (2013.01); *F16C 33/78* (2013.01); *F16C 33/7843* (2013.01); *F16C 33/7886* (2013.01); *B60B 27/0005* (2013.01); *B60B 2310/204* (2013.01); *B60B 2320/10* (2013.01); *B60B 2360/3412* (2013.01); *B60B 2380/12* (2013.01); *B60B 2900/5112* (2013.01); *B60B 2900/5114* (2013.01); *F16C 19/186* (2013.01); *F16C 41/007* (2013.01); *F16C 2226/74* (2013.01); *F16C 2326/02* (2013.01); *F16C 2326/10* (2013.01)

(58) Field of Classification Search
CPC . F16C 2326/02; B60B 27/0073; B60B 27/02; B60B 27/0005; B60B 2310/204; B60B 2360/3412; B60B 2380/12; B60B 2900/5112; B60B 2900/5114
See application file for complete search history.

(56) References Cited

U.S. PATENT DOCUMENTS

| | | | |
|---|---|---|---|
| 6,499,885 B2 * | 12/2002 | Toda | F16C 19/185 |
| | | | 384/448 |
| 6,581,939 B1 * | 6/2003 | Theros | F16C 33/723 |
| | | | 277/394 |
| 7,862,241 B2 * | 1/2011 | Ono | F16C 19/386 |
| | | | 384/484 |
| 10,093,126 B2 * | 10/2018 | Weigand | B60B 27/0073 |
| 10,442,244 B2 * | 10/2019 | Duch | F16C 41/007 |
| 11,059,323 B2 * | 7/2021 | Falossi | F16C 33/78 |
| 2017/0089394 A1 | 3/2017 | Sato | |

FOREIGN PATENT DOCUMENTS

| | | |
|---|---|---|
| CN | 202228548 U | 5/2012 |
| CN | 203756736 U | 8/2014 |
| CN | 104325840 | 2/2015 |
| DE | 112013000905 T5 | 11/2014 |
| DE | 102014205055 | 9/2015 |
| DE | 102015209781 | 12/2016 |
| JP | 2007321795 A | 12/2007 |
| JP | 2009216208 A | 9/2009 |
| JP | 2009293677 | 12/2009 |
| JP | 2012036960 A | 2/2012 |
| JP | 2014190464 A | 10/2014 |

* cited by examiner

SEALING DEVICE FOR A HUB/WHEEL ASSEMBLY AND HUB/WHEEL ASSEMBLY HAVING SUCH A SEALING DEVICE

CROSS-REFERENCE

This application claims priority to Italian patent application no. 102017000099285 filed on Sep. 5, 2017, the contents of which are fully incorporated herein by reference.

TECHNOLOGICAL FIELD

The present invention relates to a sealing device for a hub/wheel assembly. The invention also relates to a bearing/hub assembly having such a sealing device.

The present invention is particularly, although not exclusively, applicable to the field of hub/wheel assemblies for motor vehicles having a roller bearing for a non-driving wheel. In such applications, the inner ring of the bearing is rigidly secured to the shaft of the wheel and transmits to the latter the consequent rotary movement, while the outer ring of the bearing is rigidly secured to a fixed hub, for example a hub of a motor vehicle suspension. The text below will refer, by way of example, to this specific use, although it remains generally applicable.

BACKGROUND

Since the invention applies in this case to non-driving wheels which thus do not have a through-shaft along the axis of the bearing, the relevant sealing devices have an axisymmetric "cup" shape such that they laterally close off the outer ring of the bearing and create a static seal to protect the bearing from any ambient contamination (water, dust, dirt, etc.).

In their most generic form, the sealing devices comprise a plastic guard, almost cup-shaped, which is mounted on a collar of the outer ring of the roller bearing by press-fitting with interference and they include, in particular:

a cylindrical mounting wall, coaxial with an axis of symmetry of the bearing, which is coupled by means of the press-fitting with the collar of the outer ring of the bearing;

an annular reading wall, transverse to the axis of symmetry and interposed between a detection sensor mounted on the outside of the bearing and a phonic wheel mounted on the inside of the bearing, and a discoidal end wall internal to the annular reading wall and facing, transversely to the axis of symmetry, an inner ring of the bearing.

Although in earlier embodiments, sealing devices were designed to perform their function only by means of coupling by interference with the bearing, in some current embodiments, such as that described for example in JP2009216208A, the sealing devices have an annular locking tooth, which is rigidly secured to the cylindrical wall and may be snap-fitted in the collar of the outer ring of the bearing to axially secure the guard to the outer ring, and they are also provided with an adhesive material distributed around the cylindrical wall to subsequently seal the guard against the collar of the outer ring of the bearing.

However, the use of this adhesive material is not particularly good from the environmental viewpoint, and moreover requires considerable precautions during the assembly of the sealing devices, to the detriment of production times.

BRIEF SUMMARY OF THE PRESENT INVENTION

It is an aim of the present invention to produce a sealing device for a hub/wheel assembly which does not have the abovementioned disadvantages.

A sealing device for a hub/wheel assembly with a roller bearing, defined as follows:

a guard, which is coupled to an outer ring of the roller bearing so as to seal off the bearing, and which has a cylindrical mounting wall having an outer lateral surface coupled to an inner lateral surface of a collar of the outer ring;

a snap-engagement tooth for engaging the guard with the collar made along the outer lateral surface so that the snap engagement tooth snap-fits in a contoured annular groove made along the collar about the axis in the inner lateral surface; and an annular gasket made of thermoplastic elastomer and arranged inside a gripping seat made in the cylindrical mounting wall on the same side as the snap-engagement tooth, substantially at a corner defined between the cylindrical mounting wall and an annular reading wall transverse to the cylindrical mounting wall, the annular gasket being co-injection-molded inside the gripping seat and adhering chemically to a plastic from which the guard is made.

Further embodiments of the invention, which are preferred and/or particularly advantageous, are described as follows:

In an aspect of the present invention, the gripping seat is made in the cylindrical mounting wall, starting from the corner of the guard, and is defined axially towards the snap-engagement tooth by a curved surface arranged at an axial distance determined with respect to the snap-engagement tooth to allow radial deformation of the cylindrical mounting wall with respect to the collar so as to move the annular gasket away from the collar until the snap-engagement tooth is snap-fitted in the contoured annular groove.

In another aspect, the contoured annular groove further comprises an axial stop element that, when applicable, comes into contact with an end of the cylindrical mounting wall.

In yet another aspect, the annular gasket forms a rounded protuberance, projecting slightly with respect to the outer lateral surface, and is substantially flush with the lateral surface at an outward point of the curved surface, wherein the annular gasket tapers gradually towards the corner, a radial thickness of the annular gasket decreasing, until the radial thickness forms a continuous surface with the corner.

In yet another aspect, the annular gasket has two substantially rounded annular protuberances arranged parallel to one another about the axis, and a hollow defined axially by the two protuberances, wherein a first protuberance of the two protuberances is arranged substantially at an outward point of the curved surface, and wherein a second protuberance of the two protuberances is arranged substantially at the corner, with which the second protuberance joins up to form a continuous surface with the corner.

In yet another aspect, the snap-engagement tooth is circumferentially continuous, in the form of an annular ridge, or, preferably, is circumferentially discrete, in the form of bumps, which are angularly separated from one another by one of: circumferential openings or circumferential windows.

In yet another aspect, the snap-engagement tooth is circumferentially continuous, in the form is circumferentially discrete, in the form of bumps, which are angularly separated from one another by one of: circumferential openings or circumferential windows.

BRIEF DESCRIPTION OF THE DRAWINGS

The invention will now be described with reference to the attached drawings, which show some non-limiting embodiments of the invention, in which.

DETAILED DESCRIPTION OF THE PRESENT INVENTION

Figure 1:
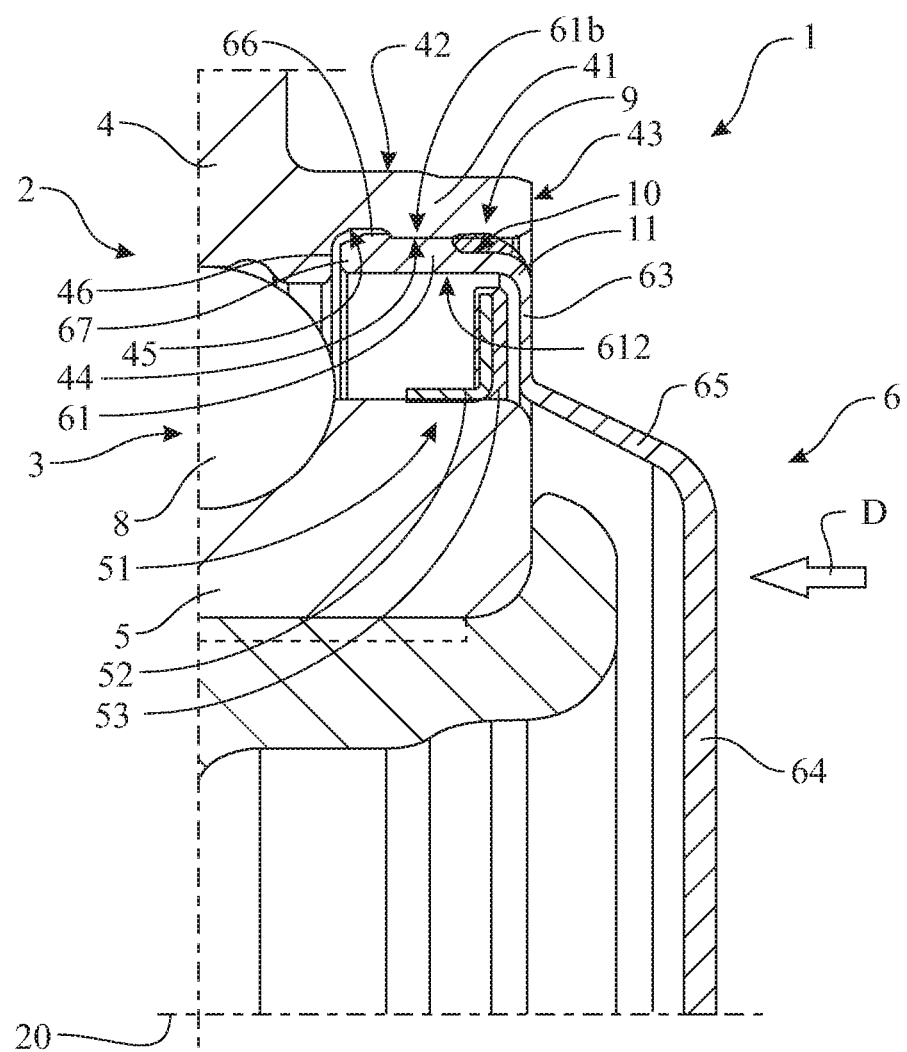
FIG. 1 presents a view, with parts in section and parts removed for clarity, of a preferred embodiment of a sealing device for a hub/wheel assembly according to the present invention.

With reference to FIG. 1, a sealing device for a hub/wheel assembly 2 is shown with the general reference sign 1.

The assembly 2 has a roller bearing 3 comprising an outer ring 4, coaxial with an axis A of rotation of the bearing 3, an inner ring 5 coaxial with the outer ring 4, and a plurality of roller elements 8, for example balls, interposed between the outer ring 4 and the inner ring 5 to allow the inner ring 5 to rotate, in rotational use, with respect to the outer ring 4, in fixed use. The outer ring 4 of the bearing 3 has a collar 41, which is defined by a cylindrical outer lateral surface 42, an annular end surface 43, and a cylindrical inner lateral surface 44. As for the inner ring 5, the inner ring 5 has a phonic wheel 51, which is rigidly secured to the inner ring 5 and has a mounting support 52 defined, preferably, by a plate bent in the shape of an L, and a ring 53 of ferromagnetic material fastened to the support 52.

The sealing device 1, according to the present invention, has the axis A as central axis and comprises a guard 6, which is coupled to the outer ring 4 of the bearing 3, has substantially a cup shape, and is made of plastic, preferably PA66 or PPA reinforced with glass fibers to provide the necessary mechanical strength and dimensional stability.

Figure 2:
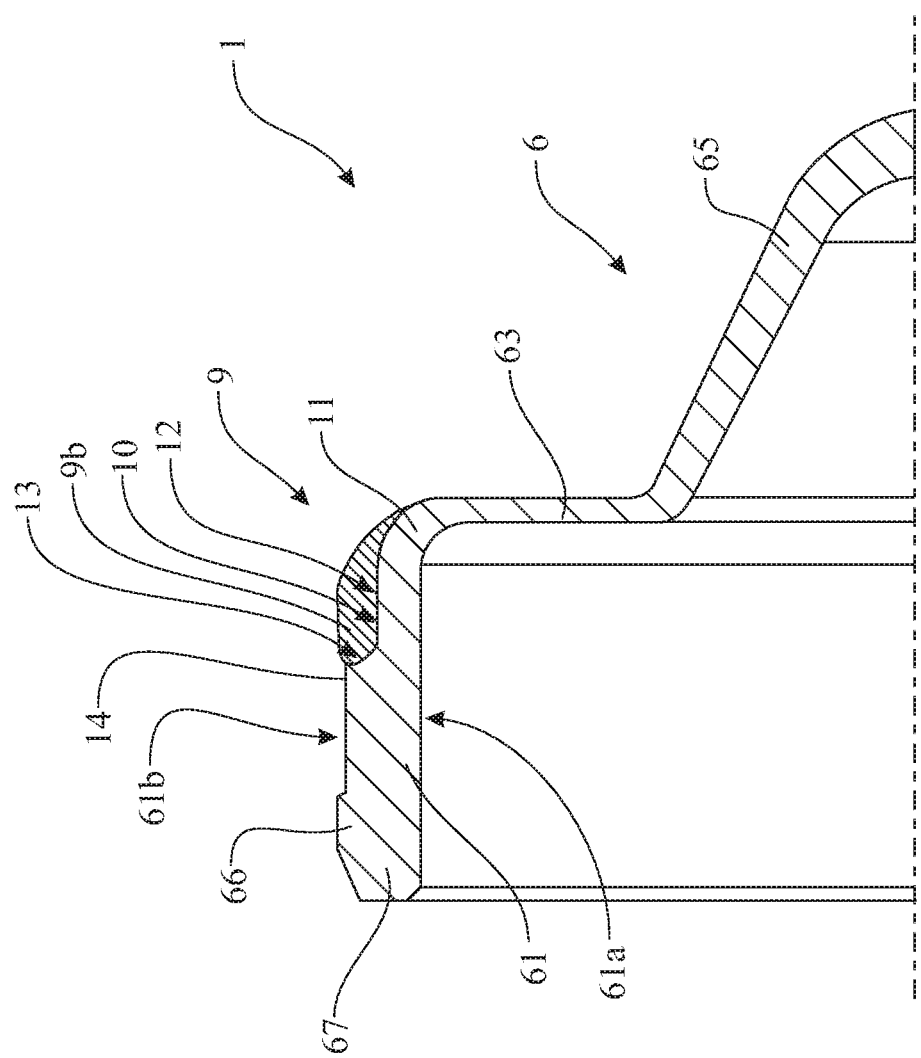
FIG. 2 presents a section view, on an enlarged scale, of a detail of the sealing device of FIG. 1.

As shown also in FIG. 2, the guard 6 comprises:
a cylindrical mounting wall 61, coaxial with the axis A, which is coupled to the collar 41 of the outer ring 4 of the bearing 3, and has an inner lateral surface 61a and an outer lateral surface 61b;
an annular reading wall 63, transverse to the axis A of symmetry, connected to the cylindrical wall 61 and interposed between a detection sensor (not shown) mounted on the outside of the bearing 3 and the phonic wheel 51 mounted on the inside of the bearing 3; and
a discoidal end wall 64 which is internal to the annular reading wall 63 and which faces, transversely to the axis A, the inner ring 5 of the bearing 3.

The guard 6 further comprises a frustoconical wall 65 for connecting the annular wall 63 to the end wall 64, the conicity of which tapers on the side away from the bearing 3, and a saw-tooth tooth 66 made along the cylindrical mounting wall 61 substantially at a free end 67 of the cylindrical mounting wall 61 axially on the side away from the annular reading wall 63. In the preferred embodiment, the tooth 66 is circumferentially continuous, in the form of an annular ridge, and can interact by snap-fitting with a recess 45, or contoured annular groove, made along the collar 41 about the axis A. Alternatively, the tooth 66 may be made circumferentially discrete, for example as a plurality of bumps angularly separated from one another by circumferential openings, or circumferential windows.

In the preferred embodiment shown in the attached figures, the tooth 66 is made on the outer lateral surface 61b of the cylindrical mounting wall 61 and extends radially outwards from the outer lateral surface 61b while, accordingly, the recess 45 is made in the cylindrical inner lateral surface 44 of the collar 41. As the guard 6 is being press-fitted in the collar 41, in a press-fitting direction D, the tooth 66 slides along and in contact with the inner lateral surface 44, until the tooth 66 reaches the recess 45, and is then snap-fitted into the recess 45, axially engaging, at least in the direction of removal, the guard 6 inside the collar 41. To prevent the guard 6 from being axially press-fitted too far into the collar 41, even after snap-fitting of the tooth 66 in the recess 45, the latter has an axial stop end wall 46 against which, where applicable, the end 67 of the cylindrical mounting wall 61 may come into contact, thereby preventing any contact between the annular reading wall 63 and the phonic wheel 51. In any case, to prevent any kind of potential contact between the annular reading wall 63 and the phonic wheel 51, the axial distance between the end 67 of the cylindrical mounting wall 61 and the axial stop end wall 46 of the recess in the collar 41 is smaller than the axial distance between the annular reading wall 63 and the phonic wheel 51.

The tooth 66 slides along the inner lateral surface 44 substantially freely, if only due to the need to overcome the friction generated by the contact between the tooth 66 and the inner lateral surface 44 and, in the alternative case in which the tooth 66 is made as circumferentially discrete, or with interruptions, or with breaks, or with windows, along the perimeter of the tooth 66, the friction may be reduced. In this latter alternative embodiment of the tooth 66, which is not shown but can clearly be deduced from what is described, the reduction of friction during assembly may also allow the guard 6 to be made of more rigid plastic, or may allow the guard 6 to be designed with a cylindrical mounting wall 61 and even, possibly, a discoidal end wall 64 and/or a frustoconical connection wall 65 which are thicker, to render the guard 6 more rigid.

Lastly, to ensure the guard 6 is leak tight once mounted on the collar 41, or to ensure the bearing 3 is sealed off from the outside and prevent external contaminants (water, dirt, dust, etc.) from entering the bearing 3, the sealing device 1 shown in FIGS. 1 and 2 further comprises an annular gasket 9 and an annular gripping seat 10, inside which the annular gasket 9 is arranged, made in the cylindrical mounting wall 61 on the same side as the tooth 66, starting from a corner 11 defined by an annular reading wall 63 and by the cylindrical mounting wall 61. The gripping seat 10 is defined radially on the inside by an annular surface 12 which is radially lower than the outer lateral surface 61b and is defined axially towards the tooth 66 by a curved surface 13 which extends from the annular surface 12 radially outwards, and as the gripping seat 10 does so intercepts the outer lateral surface 61b at an annular edge 14.

The gasket 9 is made of a thermoplastic elastomer such as TPE, TPS, TPV or the like, and is co-injection-molded inside the gripping seat 10: the plastic of the guard 6 and the thermoplastic elastomer of the gasket 9 adhere chemically to one another, thus allowing the gasket 9 to remain gripped in the gripping seat 10 under any conditions of use or assembly.

In the preferred embodiment of the sealing device 1 shown in FIG. 2, the annular gasket 9 forms a rounded protuberance 9b, projecting slightly with respect to the outer lateral surface 61b, and is substantially flush with the lateral surface 61b at the edge 14, while the annular gasket 9 tapers gradually towards the corner 11, its radial thickness decreasing, until the annular gasket 9 forms a continuous surface with the corner 11. Preferably, but not necessarily, the rounded protuberance 9b extends radially outwards from the outer lateral surface 61b without projecting beyond the tooth 66.

When the guard 6 is press-fitted into the collar 41, the tooth 66, sliding along the inner lateral surface 44, causes a radial inward flexion of the cylindrical mounting wall 61, reducing, if not completely preventing, rubbing of the gasket 9 from just before the inner lateral surface 44 substantially until the tooth 66 is snap-fitted inside the recess 45 and preserving the sealing characteristics of the gasket 9.

An axial distance L from the edge 14 of the tooth 66, which defines the axial depth of the gripping seat 10 and the dimensions of the gasket 9, is determined as a function of the plastic from which the guard 6 is made, or the rigidity and/or flexibility thereof, or as a function of the radial height of the tooth 66 or, also, as a function of the radial dimensions of the gasket 9: indeed, during press-fitting of the guard 6 in the collar 41, due to the outer lateral surface 61b being moved elastically away from the cylindrical inner lateral surface 44, the gasket 9 should not be caught in any way, but should be able to slide freely between the two lateral surfaces 61b and 44.

Once the tooth 66 is snap-fitted inside the recess 45, the cylindrical mounting wall 61 returns to its undeformed configuration, radially compressing the gasket 9 between the cylindrical mounting wall 61 and the collar 41, thereby ensuring the necessary leak-tight seal of the sealing device 1.

Figure 3:
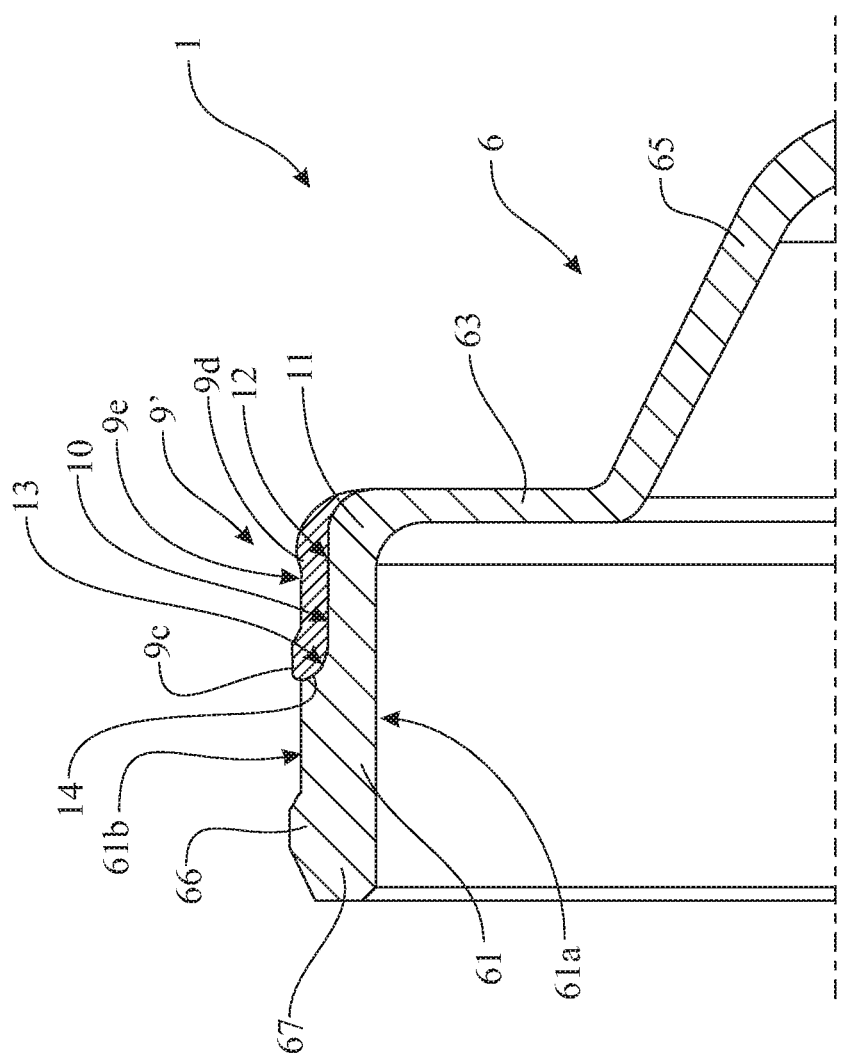
FIG. 3 presents a section view, on an enlarged scale, of an alternative embodiment of the detail of the sealing device of FIG. 1.

FIG. 3 shows an annular gasket 9' which is substantially similar to the annular gasket 9 described above, from which the annular gasket 9' differs in that instead of having one rounded protuberance 9b projecting slightly with respect to the outer lateral surface 61b, the annular gasket 9' has two substantially rounded annular protuberances 9c and 9d arranged parallel to one another about the axis A so as to define between them a hollow 9e, in which the protuberance 9c is arranged substantially at the edge 14, while the protuberance 9d is arranged substantially at the corner 11 with which the protuberance 9d joins up to form a continuous surface with the corner 11.

Also in this alternative embodiment of the annular gasket 9', the protuberances 9c and 9d project slightly radially with respect to the outer lateral surface 61b, and preferably, but not necessarily, the protuberances 9c and 9d extend radially outwards from the outer lateral surface 61b without projecting radially beyond the tooth 66. Again, due to the elastic deformation caused by the tooth 66 during press-fitting, at least the protuberance 9c is not caught during the assembly of the guard 6, and is able to slide substantially freely between the two lateral surfaces 61b and 44. Once the tooth 66 is snap-fitted inside the recess 45, the cylindrical mounting wall 61 returns to its undeformed configuration, radially compressing the gasket 9 between the cylindrical mounting wall 61 and the collar 41, thereby ensuring the necessary leak-tight seal of the sealing device 1. The hollow 9e also has the purpose of reducing the friction when, during assembly of the guard 6 in the collar 41, the gasket 9 should come into contact with the surface 44 of the collar 41, especially at the protuberance 9d, which is the protuberance which is axially furthest away from the tooth 66 and which is less affected by the elastic deformation of the cylindrical mounting wall 61 caused by the tooth 66.

Unlike the annular gasket 9 having a single protuberance 9b, the annular gasket 9' may extend axially further along the cylindrical mounting wall 61, and can distribute the sealing capacity over the two protuberances 9c and 9d, taking advantage of the hollow 9e which acts, as described above, as a space between the protuberances 9c and 9d.

The sealing device 1 described above, in the preferred embodiments thereof, has undeniable advantages when it comes to the production of the guard 6, which may be made completely in a single molding operation, and when it comes to assembly with the bearing 3 since the guard 6 may be presented to, and mounted on, the bearing 3 without the need for any other operation. Above all, the fact that a gripping seat 10 is made, and the material for the gasket 9 is injected therein, helps keep control of all the geometric dimensions of the sealing device 1 much to the advantage of performance in terms of sealing and stability. Moreover, in combination, the fact that the gripping seat 10 and the related gasket 9 are on the same side as the tooth 66 makes it possible to avoid any damage to the gasket 9 when the guard 6 is mounted on the bearing 3.

According to the invention, by virtue of the sealing device 1, a hub/wheel assembly 2 like that described above is obtained in which the guard 6 comprises:

a cylindrical mounting wall 61, coaxial with the axis A, which is coupled to the collar 41 of the outer ring 4 of the bearing 3, and has an inner lateral surface 61a and an outer lateral surface 61b;

a saw-tooth tooth 66 made along the cylindrical mounting wall 61, and an annular gasket 9, which is arranged inside a respective annular gripping seat 10 made in the cylindrical mounting wall 61 on the same side as the tooth 66, starting from a corner 11 defined by an annular reading wall 63 and by the cylindrical mounting wall 61.

In the above hub/wheel assembly 2, in the guard 6, preferably in combination with the abovementioned features, the saw-tooth tooth 66 and the annular gasket 9 may be arranged radially on the outside of the cylindrical mounting wall 61 so as to interact, respectively, with a recess 45 made on the inside of the collar 41 and a cylindrical inner lateral surface 44 of the collar 41.

In addition to the embodiments of the invention as described above, it is to be understood that there are numerous other variants. It is also to be understood that the embodiments are solely exemplary and do not limit the scope of the invention, its applications, or its possible configurations. On the contrary, although the above description enables those skilled in the art to apply the present invention in at least one exemplary configuration, it is to be understood that numerous variations of the described components may be devised, without thereby departing from the scope of the invention as defined in the appended claims, interpreted literally and/or according to their legal equivalents.

What is claimed is:

1. A sealing device for a hub/wheel assembly with a roller bearing, the sealing device having a central axis, and comprising:

a guard, which is coupled to an outer ring of the roller bearing so as to seal off the bearing, and which has a cylindrical mounting wall having an outer lateral surface coupled to an inner lateral surface of a collar of the outer ring, wherein the guard further has an annular reading wall transverse to the cylindrical mounting wall;

a snap-engagement tooth for engaging the guard with the collar made along the outer lateral surface so that the snap engagement tooth snap-fits in a contoured annular groove made along the collar about the axis in the inner lateral surface; and an annular gasket made of thermoplastic elastomer and arranged inside a gripping seat made in the cylindrical mounting wall on the same side as the snap-engagement tooth, substantially at a corner defined between the cylindrical mounting wall and the annular reading wall transverse to the cylindrical mounting wall, wherein the annular gasket is disposed at and extends from the annular reading wall, the annular gasket being coinjection-molded inside the gripping seat and adhering chemically to a plastic from which the guard is made.

2. The sealing device according to claim 1, wherein the gripping seat is made in the cylindrical mounting wall, starting from the corner of the guard, and is defined axially towards the snap-engagement tooth by a curved surface arranged at an axial distance determined with respect to the snap-engagement tooth to allow radial deformation of the cylindrical mounting wall with respect to the collar so as to move the annular gasket away from the collar until the snap-engagement tooth is snap-fitted in the contoured annular groove.

3. The sealing device according to claim 2, the contoured annular groove further comprising an axial stop element that, when applicable, comes into contact with an end of the cylindrical mounting wall.

4. The sealing device according to claim 3, wherein the annular gasket forms a rounded protuberance, projecting slightly with respect to the outer lateral surface, and is substantially flush with the lateral surface at an outward point of the curved surface,
wherein the annular gasket tapers gradually towards the corner, a radial thickness of the annular gasket decreasing, until the radial thickness forms a continuous surface with the corner.

5. The sealing device according to claim 3, wherein the annular gasket has two substantially rounded annular protuberances arranged parallel to one another about the axis, and a hollow defined axially by the two protuberances,
wherein a first protuberance of the two protuberances is arranged substantially at an outward point of the curved surface, and
wherein a second protuberance of the two protuberances is arranged substantially at the corner, with which the second protuberance joins up to form a continuous surface with the corner.

6. The sealing device according to claim 1, wherein the snap-engagement tooth is circumferentially continuous, in the form of an annular ridge, or, is circumferentially discrete, in the form of bumps, which are angularly separated from one another by one of: circumferential openings or circumferential windows.

7. The sealing device according to claim 1, wherein the snap-engagement tooth is configured as bumps, which are angularly separated from one another by one of: circumferential openings or circumferential windows.

8. A hub/wheel assembly comprising: an outer ring, in stationary use, an inner ring, in rotational use, at least one row of rotating bodies interposed between the outer ring and the inner ring, and a sealing device with a central axis, the sealing device comprising:

a guard, which is coupled to the outer ring of the bearing so as to seal off the bearing, and which has a cylindrical mounting wall having an outer lateral surface coupled to an inner lateral surface of a collar of the outer ring, wherein the guard further has an annular reading wall transverse to the cylindrical mounting wall;

a snap-engagement tooth for engaging the guard with the collar made along the outer lateral surface so that the snap-engagement tooth snap-fits in a contoured annular groove made along the collar about the axis in the inner lateral surface; and an annular gasket made of thermoplastic elastomer and arranged inside a gripping seat made in the cylindrical mounting wall on the same side as the snap-engagement tooth, substantially at a corner defined between the cylindrical mounting wall and the annular reading wall transverse to the cylindrical mounting wall, wherein the annular gasket is disposed at and extends from the annular reading wall, the annular gasket being co-injection-molded inside the gripping seat and adhering chemically to a plastic from which the guard is made.

* * * * *